No. 786,274. PATENTED APR. 4, 1905.
J. T. DUFF.
SECTIONAL GEAR WHEEL.
APPLICATION FILED AUG. 25, 1904.
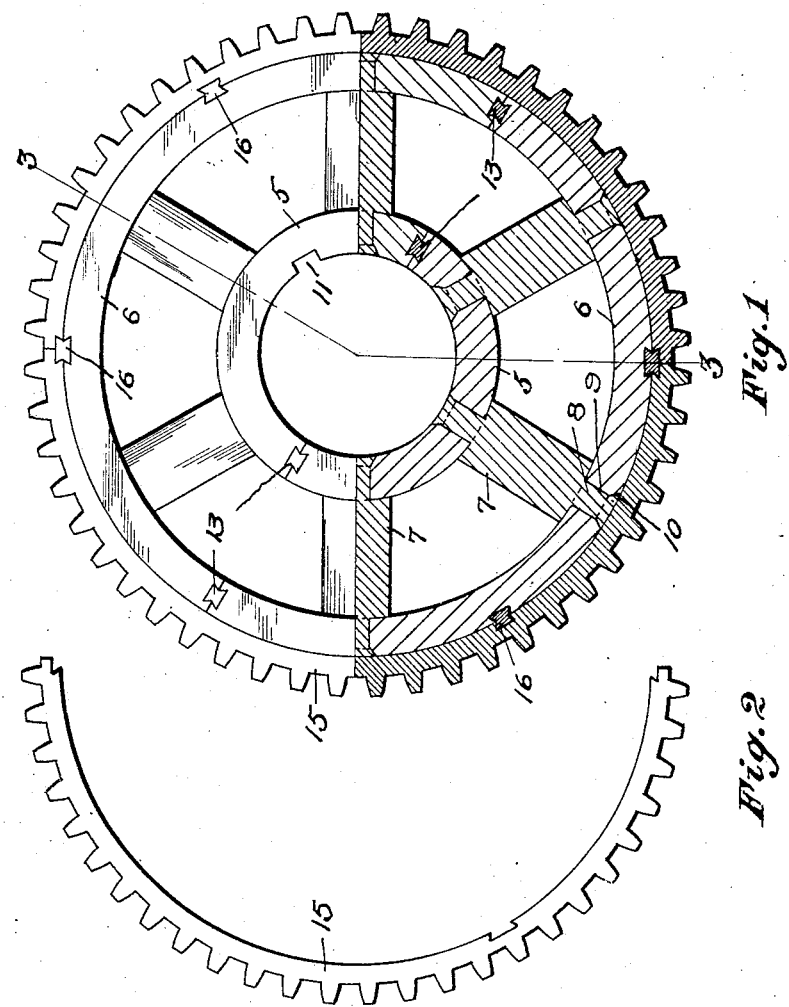
Fig. 1.
Fig. 2.
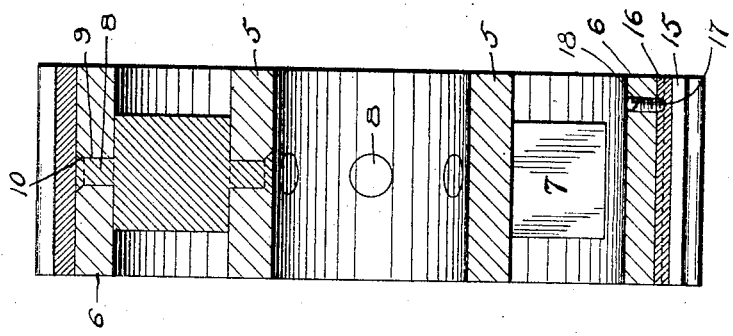
Fig. 3.
WITNESSES
Lindsay deB. Little
J. R. Keller
INVENTOR
John T. Duff
By Kay, Totten Winter
His Attys.

No. 786,274. Patented April 4, 1905.

UNITED STATES PATENT OFFICE.

JOHN T. DUFF, OF PITTSBURG, PENNSYLVANIA, ASSIGNOR OF TWO-THIRDS TO WILLIAM H. LATSHAW, OF PITTSBURG, PENNSYLVANIA, AND JOSHUA RHODES, OF ALLEGHENY, PENNSYLVANIA.

SECTIONAL GEAR-WHEEL.

SPECIFICATION forming part of Letters Patent No. 786,274, dated April 4, 1905.

Application filed August 25, 1904. Serial No. 222,168.

*To all whom it may concern:*

Be it known that I, JOHN T. DUFF, a resident of Pittsburg, in the county of Allegheny and State of Pennsylvania, have invented a new and useful Improvement in Sectional Gear-Wheels; and I do hereby declare the following to be a full, clear, and exact description thereof.

My invention relates to gear-wheels; and the object is to provide a gear-wheel which is very strong, light, and durable, and especially such a gear-wheel when so constructed that it can be put in place on and removed from a shaft or axle without disturbing the latter or its hangers.

To these ends the invention consists, generally stated, in a gear-wheel constructed as hereinafter described and claimed.

In the accompanying drawings, Figure 1 shows a gear-wheel, partly in side view and partly in section. Fig. 2 is a side view of one of the tooth-sections detached from the wheel; and Fig. 3 is a vertical section on line 3 3, Fig. 1.

My gear-wheel will comprise a body adapted for attachment to a shaft or axle and which will have a hub and rim connected either by spokes or by a web. This body may be cast or may be formed of wrought metal, such as wrought-steel. When the latter, it preferably will be of the spoke variety and is so shown in the drawings. The drawings also show the gear of the sectional type, although certain features thereof, such as the renewable rim, can be applied to non-sectional gears.

As shown in the drawings, the body is composed of two similar sections, each comprising a hub-section 5 and a rim-section 6, united by spokes 7. Both these hub and rim sections are preferably formed of wrought-steel and may be made by rolling. The rim-section 6 may be an ordinary rolled rectangular bar cut to length and bent to semi-annular shape. The hub-section 5 may be formed in the same way or it may be made by rolling a bar in concave form, having a cross-section similar to the section of the hub shown in Fig. 1, and then cutting short pieces off said bar to form said hub-sections. The spokes 7 are attached to the hub and rim, preferably by providing said spokes with tenons 8, which project through openings 9 in both the hub and rim sections, the outer ends of said tenons being upset in countersunk portions 10 of said holes. In this way the hub and rim sections are securely and firmly united. One of the hub-sections will be provided with a keyway 11 for attachment to the shaft or axle, although this is not essential. The two body-sections are similar and are united by suitable dovetailed keys or gibs 13, fitting in matching undercut slots formed in the meeting edges of the hub and rim sections. Four such keys are used, two for uniting the hub-sections and two for uniting the rim-sections. In this manner the gear-body is firmly secured together and forms, in effect, a rigid whole. The keys 13 can be easily driven out and said body-sections separated to permit the removal of the gear from the shaft or axle.

The toothed portion of my gear-wheel is formed as a separate and removable portion, and this will be the case even though the body is not constructed in the specific manner described or even if the gear is not made of wrought metal. This toothed rim will be either in a single piece, especially when the gear is not made in separable sections; but preferably it will be made in several sections, even though the wheel-body itself be not made in sections. The purpose of having a separate toothed rim is to permit its renewal in case of injury, and it is preferable to have said toothed rim sectioned, so that if a tooth in one section breaks off only that portion of the rim need be renewed. In the drawings this toothed rim is shown formed of two similar and equal sections 15, although in actual practice the number of said sections may be materially more than two. These rim-sections will be provided on their outer faces with the desired form of teeth, and they are secured to the body by means of dovetailed gibs or keys 16, driven into matching undercut slots formed on the inner faces of the rim-sections and outer face of the body-rim. Any necessary number of such gibs or keys can be employed, the drawings showing four. These gibs or keys will be located in any suitable position with reference to the point of attachment of the spokes. These gibs are made to fit tightly, so as to hold the toothed sections firmly in place on the wheel-body. They nevertheless can be driven out whenever it is necessary to renew any portion of the toothed rim. To prevent the keys from jarring loose, they are each provided with a depression 17 for receiving the end of a binding-screw 18, fitting in a tapped hole in the body-rim. If desired, the keys may be integral with either the toothed rim or the body portion. This plan can be followed, especially when the body is made by casting.

The rim portion 6 of the wheel-body has its outer or peripheral face substantially parallel to the axis of the wheel, and the toothed rim-sections 15 have corresponding inner faces. The keyways are formed in these parallel faces, and the dovetailed keys draw the rim-sections down tightly against the outer face of the body rim portion. Consequently the removable toothed rim-sections are held firmly in place and are backed for their entire lengths and widths by the solid metal of the body rim portion and can therefore efficiently resist all strains and thrusts.

Preferably the toothed rim-sections will be formed of forged steel and will be tempered and hardened after being bent to shape and having the teeth cut thereon. They will thus be able to withstand severe wear, and the life of the gear-teeth will be many times greater than in gear-wheels now in use. Should any of the teeth break off or become unduly worn, that particular section of the toothed rim can be readily replaced by a new one, so that the entire wheel need not be discarded, as is now the case.

The gear-wheel described can be made very light in proportion to the strength thereof. The wearing qualities thereof are many times greater than of any gear-wheel in use at the present time. No part thereof is subject to wear except the teeth, and these can be renewed whenever necessary. As a consequence the wheel will be very economical when compared with existing forms of gear-wheels.

I wish it understood that all features of my invention need not necessarily be embodied in a single gear-wheel. For instance, the renewable toothed rim may be used in conjunction with a body materially different from that shown and described and may even be used on a body which is not separable. Various changes also may be made in the details of construction without departing from the spirit of my invention.

What I claim is—

1. A gear-wheel comprising a body adapted to be secured to a shaft and having a peripheral face substantially parallel to its axis, a removable and renewable toothed rim provided with an inner face corresponding to the peripheral face of the body, and keys driven into matching slots in said body and rim-faces and serving to secure the same together.

2. A gear-wheel comprising a body adapted to be secured to a shaft and having a peripheral face substantially parallel to its axis, a toothed rim formed in several sections each provided with an inner face corresponding to the peripheral face of the body, and dovetailed keys fitting in matching undercut slots in the meeting faces of the body and rim sections and serving to secure the same together.

3. A gear-wheel comprising a body composed of several sections, means for securing said body-sections together, a sectional toothed rim, and dovetailed keys fitting in matching undercut slots in the body and toothed rim-sections and serving to secure them together.

4. A gear-wheel comprising a body composed of several sections each having a peripheral face substantially parallel to the axis of the wheel, means for securing said body-sections together, a toothed rim formed in several sections each provided with an inner face corresponding to the peripheral face of the body, and dovetailed keys fitting in matching undercut slots in the meeting faces of the body and rim sections and serving to secure the same together.

5. A gear-wheel comprising a body composed of two sections, dovetailed keys fitting in matching undercut slots in said body-sections and serving to secure the same together, a toothed rim formed in several sections, and dovetailed keys fitting in matching undercut slots in said body and rim sections and serving to secure the same together.

6. A gear-wheel comprising a sectional body, each section composed of a hub and rim portions and spokes uniting the same, means for uniting said body-sections, a sectional toothed rim, and dovetailed keys fitting in matching undercut slots in said body and rim sections and serving to secure the same together.

7. A gear-wheel comprising a sectional body, each section formed of a hub and rim portions and spokes uniting the same and all formed of wrought metal, means for securing said body-sections together, a sectional toothed rim formed of hardened steel, and dovetailed keys fitting in undercut matching slots in the body and rim sections and serving to secure the same together.

8. A wrought-metal gear-wheel comprising a hub, a rim, and spokes upset in said hub and rim, said gear-wheel being formed in two separable sections, and dovetailed keys fitting in undercut matching slots in the hub and rim portions of the two sections and serving to secure the same together.

9. A gear-wheel comprising a body adapted to be secured to a shaft and having a peripheral face substantially parallel to its axis, a removable and renewable toothed rim formed in several sections each provided with an inner face corresponding to the peripheral face of the body, and means for securing said rim to said body.

10. A gear-wheel comprising a body adapted to be secured to a shaft and having a peripheral face substantially parallel to its axis, a removable and renewable toothed rim formed in several sections and each composed of hardened steel and provided with an inner face corresponding to the peripheral face of the body, and means for securing said rim to said body.

In testimony whereof I, the said JOHN T. DUFF, have hereunto set my hand.

JOHN T. DUFF.

Witnesses:
F. W. WINTER,
ROBERT C. TOTTEN.